(12) United States Patent
Doherty

(10) Patent No.: US 6,185,742 B1
(45) Date of Patent: Feb. 13, 2001

(54) COOL GARMENT

(76) Inventor: Brian Doherty, 160 River Oaks Rd., Melbourne Beach, FL (US) 32951

( * ) Notice: Under 35 U.S.C. 154(b), the term of this patent shall be extended for 0 days.

(21) Appl. No.: 09/425,437

(22) Filed: Oct. 22, 1999

Related U.S. Application Data
(60) Provisional application No. 60/105,344, filed on Oct. 23, 1998.

(51) Int. Cl.⁷ .............................. A62B 17/00; F25D 23/12
(52) U.S. Cl. .................... 2/81; 2/458; 62/259.3; 62/530; 165/46; 165/136; 607/96
(58) Field of Search ............................ 2/69, 81, 92, 457, 2/102, 57, 247, 458; 62/259.3, 530; 165/46, 135, 136, 902; 607/96, 108; 428/384, 389, 394, 327, 913

(56) References Cited

U.S. PATENT DOCUMENTS

| | | | |
|---|---|---|---|
| 2,567,233 | * 9/1951 | Palmquist et al. | 88/82 |
| 3,172,942 | * 3/1965 | Berg | 88/82 |
| 3,691,564 | * 9/1972 | La Marre et al. | 2/2 |
| 3,950,789 | * 4/1976 | Konz et al. | 2/93 |
| 4,186,294 | * 1/1980 | Bender | 219/527 |
| 4,472,835 | * 9/1984 | Clark | 2/102 |
| 4,533,592 | * 8/1985 | Binghanm | 428/213 |
| 4,546,042 | * 10/1985 | Quon | 428/378 |
| 4,738,119 | * 4/1988 | Zafred | 62/259.3 |
| 4,856,294 | 8/1989 | Scaringe et al. | |
| 5,072,455 | 12/1991 | St. Ours | |
| 5,290,904 | 3/1994 | Colvin et al. | |
| 5,305,471 | 4/1994 | Steele et al. | |
| 5,325,538 | * 7/1994 | Schoenweiss et al. | 2/2.5 |
| 5,363,663 | * 11/1994 | Chen | 62/259.3 |
| 5,415,222 | 5/1995 | Colvin et al. | |
| 5,421,326 | * 6/1995 | Rankin et al. | 128/201.19 |
| 5,524,293 | 6/1996 | Kung | |
| 5,722,482 | 3/1998 | Buckley | |
| 5,755,110 | * 5/1998 | Silvas | 62/259.3 |

* cited by examiner

Primary Examiner—Gloria M. Hale
Assistant Examiner—Tejush Patel
(74) Attorney, Agent, or Firm—King and Schickli, PLLC

(57) ABSTRACT

A cool garment includes an inner, flexible liner including at least one pocket, a pouch for holding a phase change material having a melting/freezing temperature between 50–60° F. held in the pocket, an outer metalized skin for reflecting heat away from the wearer of the cool garment and a non-glare coating on the metalized skin to reduce or prevent potentially dangerous reflection of high intensity light.

6 Claims, 2 Drawing Sheets

COOL GARMENT

This application claims the benefit of U.S. Provisional Patent Application Serial No. 60/105,344 filed Oct. 23, 1998.

TECHNICAL FIELD

The present invention relates generally to micro-climate garments and more particularly to a vest or shirt adapted for use by welder's, hot metal workers and others to provide personal cooling in harsh, high temperature environments thereby allowing the wearer to work comfortably in such environments over a longer period of time before requiring relief.

SUMMARY OF THE INVENTION

It is a primary object of the present invention to provide a micro-climate garment particularly adapted for use by welder's, hot metal workers and others wherein that garment incorporates a phase change material having a melting/freezing temperature of, for example, 50–60° F.

Still another object of the present invention is to provide a micro-climate garment including an aluminized outer skin and high temperature insulating and flame retardant protective layer to provide protection from sparks and hot metal spatter.

Still another object of the present invention is to provide a micro-climate garment including an aluminized outer face that is coated with a non-glare material to prevent "flash" (reflection) from a welding arc or other intense light source that could potentially induce ocular damage to parties in the work area not wearing protection eyewear.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a welder's garment is provided including an inner, flexible liner having at least one pocket. The welder's garment also includes a pouch including a phase change material having a melting/freezing temperature between 50–60° F. that is held in the pocket. Additionally, an outer metalized, preferably aluminized, skin is provided for reflecting heat away from the wearer of the welder's garment. Still further, a non-glare coating of polyurethane enamel or other appropriate material is provided on the metalized skin in order to reduce or prevent potentially dangerous reflection of high intensity light such as a welding arc which might otherwise cause temporary visual impairment or even permanent ocular damage to unsuspecting individuals without eyewear protection in the vicinity of the work area.

Preferably, the phase change material utilized in the garment of the present invention is at least one n-alkane. More specifically, the phase change material may be selected from a group including tetradecane, pentadecane, hexadecane, heptadecane and mixtures thereof. In the most preferred embodiment the phase change material is a mixture of tetradecane and hexadecane providing a melting/freezing temperature of approximately 55° F.

In accordance with a further aspect of the present invention, the welder's garment may also include an intermediate insulating layer preferably constructed from flame retardant material. Advantageously, the metalized skin of the welder's vest provides the wearer with excellent protection against sparks and molten metal splash which may be experienced during the welding process. At the same time, the non-glare coating substantially eliminates the potential for ocular injury that might otherwise occur from dangerous reflection of high intensity light such as the welding arc on the metalized skin. Accordingly, the welder's garment of the present invention represents a significant advance in the art.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to present preferred embodiment of the invention, and an example which is illustrated in the accompanying drawing.

DETAILED DESCRIPTION OF THE INVENTION

Figure 1:
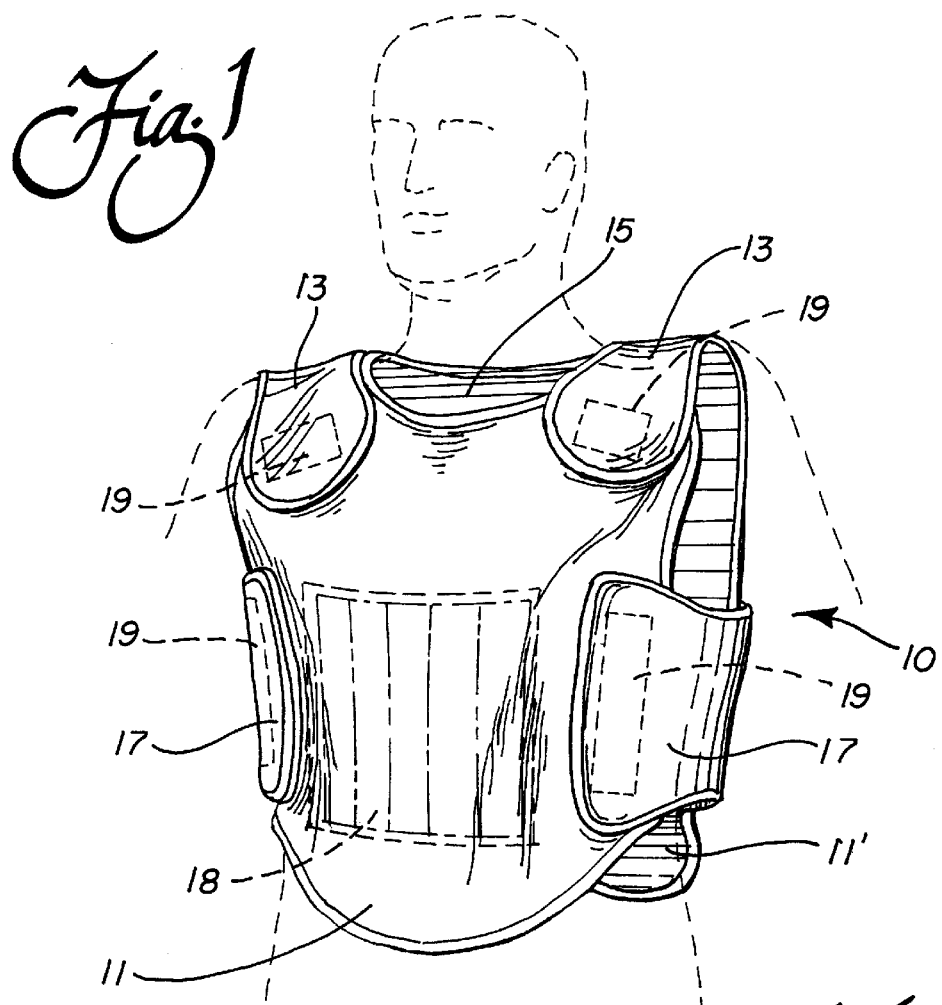
FIG. 1 is a perspective view of the welder's vest of the present invention.

Reference is now made to FIG. 1 generally showing a welder's vest 10 constructed in accordance with the teachings of the present invention. It should be appreciated that the vest 10 shown is presented for purposes of illustration and that the invention is not specifically limited to a vest but may include a shirt, a pair of pants, a coat or other garment appropriate for protecting a welder or other worker from potentially hazardous sparks, high temperature molten materials and even exposure that might otherwise occur in high temperature industrial environments.

As shown, the welder's vest 10 may be generally described as including front and rear panels 11, 11' connected together by shoulder straps 13 so as to define an opening 15 for receiving the neck and head of the wearer. A belt/straps 17 are also provided to completely secure the vest 10 in position. Hook and loop fasteners 19 such as Velcro may be provided to allow adjustment of the straps 13, 17 to allow a proper fit.

Each of the panels 11, 11' of the welder's vest 10 shown includes an inner, flexible liner 12 constructed from any appropriate fabric such as aramid fibers, cotton, cotton polyester blends, etc. The liner 12 includes at least one and preferably a series of pockets 14. Each pocket 14 is closed on three sides by means of appropriate seams 16. A pouch 18 including a phase change material having a melting/freezing temperature between 50–60° F is held in each of the pockets 14.

Preferably, the phase change material is at least one n-alkane. Thus, for example, the phase change material may be selected from a group including tetradecane, pentadecane, hexadecane, heptadecane and mixtures thereof. These compounds have melting/freezing temperatures, respectively, of approximately 43, 50, 64 and 71° F. In one particularly useful embodiment, the phase change material is a mixture of tetradecane and hexadecane so as to provide a freezing/melting temperature of approximately 55° F.

Figure 3:
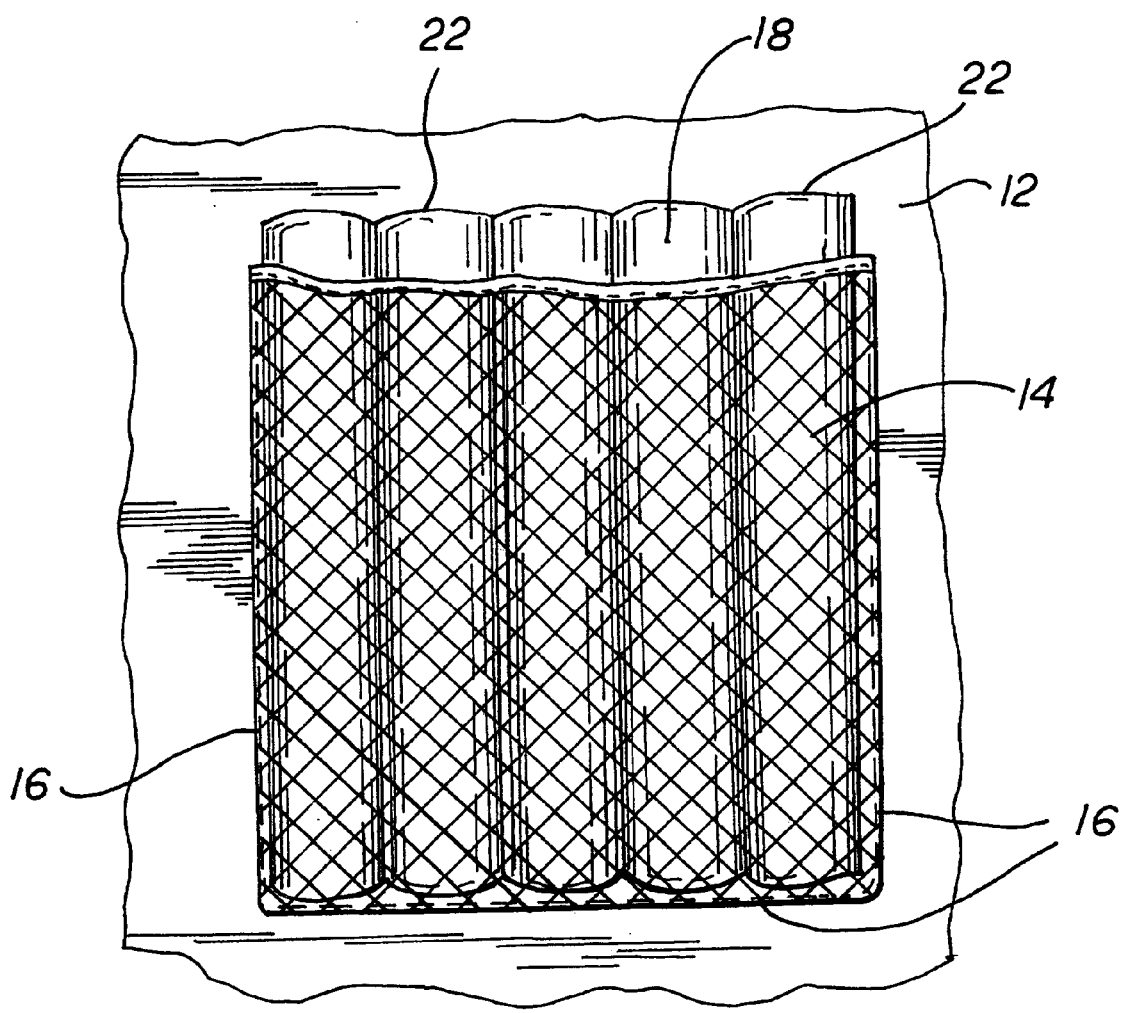
FIG. 3 is a detailed front elevational view of a pouch for holding the phase change material.

As best shown in FIG. 3, the pouch 18 preferably includes front and rear walls 20 of polyurethane, polyethylene, polyether or other appropriate plastic material. Pouch 18 further comprises a plurality of sealed chambers 22 with adjacent sealed chambers being connected together by means of an interdisposed living hinge in a manner well known in the art. Such a design prevents the phase change material filling each chamber 22 from lumping and further maintains flexibility so that the pouch 18 will freely and comfortably conform to movements of the wearer.

Figure 2:
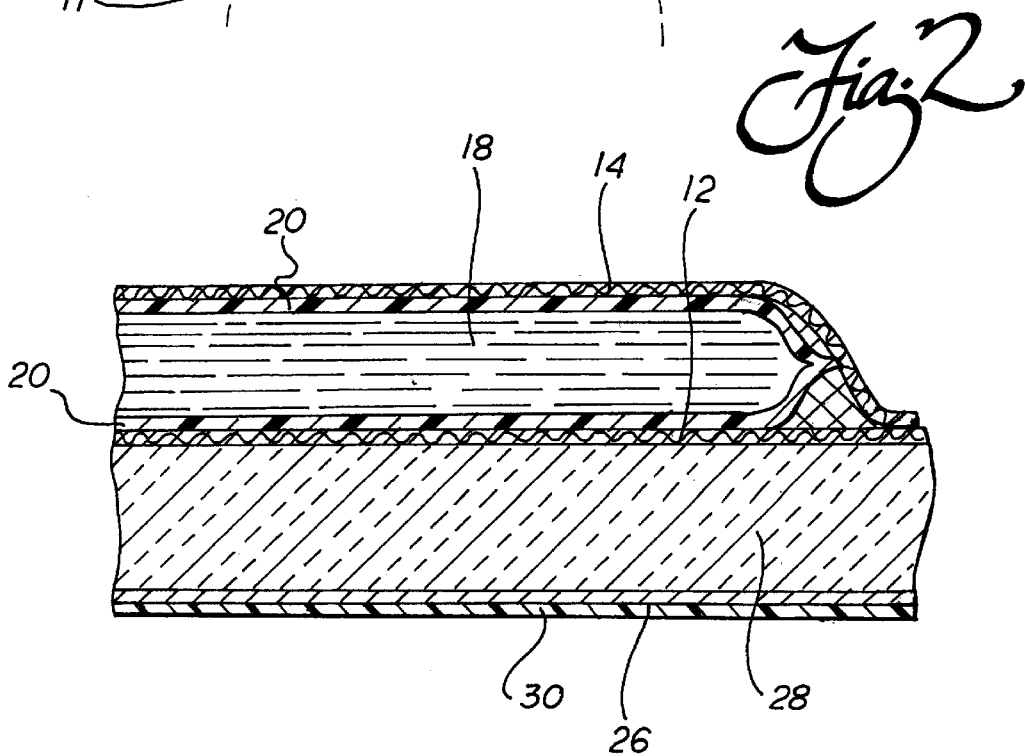
FIG. 2 is a schematical cross sectional view showing the layered construction of the vest shown in FIG. 1.

As best shown in FIG. 2, the welder's vest 10 also includes an outer metalized and more particularly aluminized skin 26 for reflecting heat away from a wearer of the welders vest. Preferably, a dual mirror aluminized fabric of aramid fiber is utilized for the outer skin 26. Most preferably, a 5-ply dual mirror fabric is used incorporating an aluminum layer, a protective film, a second aluminum layer, a heat stable adhesive and an underlying fabric backing. Advantageously, the aluminized skin 26 provides good abrasion and wear resistance and an increased insulating factor protecting the wearer from heat while also the protecting the wearer from hot sparks and providing enhanced molten metal splash resistance.

Between the aluminized skin 26 and the inner liner 12, the vest 10 preferably includes an intermediate insulating layer 28. Preferably, the insulating layer is formed from a combination of glass and ceramic fibers that contains a special finish that is formulated to provide excellent resistance to temperatures of up to 1500° F. This material is flame retardant and provides further excellent resistance to sparks and molten metal splashes in combination with the aluminized outer skin 26.

In addition, the welders vest 10 includes a non-glare coating 30 that is applied over the aluminized outer skin 26. Preferably, the non-glare coating is achieved by application of polyurethane enamel directly to the aluminized skin 26. Advantageously, the non-glare coating 30 reduces the reflective characteristics of the aluminized skin so that high intensity light such as a welding arc is reflected at a substantially reduced intensity. As a result, potentially dangerous reflection of the high intensity light is avoided. Thus, others in the work area not wearing protective eyewear will be less likely to be temporarily blinded or receive semi permanent or permanent ocular damage by reflection of the high intensity arc off the aluminized outer skin 26 of the welder's vest 10.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention in various embodiments and with various modifications as re suited to the particular use contemplated. All such modifications and variations are within the scope of the invention as determined by the appended claims when interpreted in accordance with the breadth to which they are fairly, legally and equitably entitled.

What is claimed is:

1. A cool garment, comprising:

an inner, flexible liner including at least one pocket;

a pouch including a phase change material having a melting/freezing temperature between 50–60° F. held in said pocket;

an outer metalized skin for reflecting heat away from a wearer of said cool garment; and a non-glare coating on said metalized skin in order to reduce or prevent potentially dangerous reflection of high intensity light.

2. The cool garment of claim 1, further including an intermediate insulating layer.

3. The cool garment of claim 1, wherein said phase change material is at least one n-alkane.

4. The cool garment of claim 1, wherein said phase change material is selected from a group consisting of tetradecane, pentadecane, hexadecane, heptadecane and mixtures thereof.

5. The cool garment of claim 1, wherein said phase change material is a mixture of tetradecane and hexadecane.

6. The cool garment of claim 1, wherein said non-glare coating is polyurethane enamel.

* * * * *